(12) United States Patent
Beals

(10) Patent No.: US 9,813,104 B2
(45) Date of Patent: *Nov. 7, 2017

(54) MULTI NETWORK RADIO WITH SHARED TRANSMITTER

(71) Applicant: ECHOSTAR TECHNOLOGIES L.L.C., Englewood, CO (US)

(72) Inventor: William Michael Beals, Englewood, CO (US)

(73) Assignee: ECHOSTAR TECHNOLOGIES LLC, Englewood, CO (US)

( * ) Notice: Subject to any disclaimer, the term of this patent is extended or adjusted under 35 U.S.C. 154(b) by 228 days.

This patent is subject to a terminal disclaimer.

(21) Appl. No.: 14/789,701

(22) Filed: Jul. 1, 2015

(65) Prior Publication Data

US 2015/0303980 A1    Oct. 22, 2015

Related U.S. Application Data

(63) Continuation of application No. 14/045,378, filed on Oct. 3, 2013, now Pat. No. 9,088,343.

(51) Int. Cl.
| | |
|---|---|
| *H04B 1/44* | (2006.01) |
| *H04W 4/00* | (2009.01) |
| *H04L 12/28* | (2006.01) |
| *H04W 88/02* | (2009.01) |
| *H04N 5/44* | (2011.01) |
| *H04N 21/41* | (2011.01) |
| *H04N 21/436* | (2011.01) |
| *H04N 21/4363* | (2011.01) |

(52) U.S. Cl.
CPC .......... *H04B 1/44* (2013.01); *H04L 12/2834* (2013.01); *H04N 5/4403* (2013.01); *H04N 21/4131* (2013.01); *H04N 21/4363* (2013.01); *H04N 21/43615* (2013.01); *H04W 4/008* (2013.01); *H04L 2012/2841* (2013.01); *H04N 2005/4426* (2013.01)

(58) Field of Classification Search
CPC .... H04B 1/40; H04B 1/44; H04B 1/48; H04L 12/2834; H04L 12/28; H04M 5/4403; H04M 21/4131; H04W 28/16; H04W 74/00; H04W 88/06; H04W 88/02
See application file for complete search history.

(56) References Cited

U.S. PATENT DOCUMENTS

| | | | |
|---|---|---|---|
| 5,666,365 | A | 9/1997 | Kostreski |
| 6,404,756 | B1 | 6/2002 | Whitehill et al. |
| 6,414,765 | B1 | 7/2002 | Li et al. |
| 7,551,546 | B2 | 6/2009 | Ma et al. |
| 8,035,479 | B2 * | 10/2011 | Tran .................. G07C 9/00309 340/5.71 |
| 8,515,489 | B2 * | 8/2013 | Chang ............... H04W 72/1215 455/127.4 |
| 9,088,343 | B2 * | 7/2015 | Beals ................. H04N 21/4131 |

(Continued)

*Primary Examiner* — Blane Jackson
(74) *Attorney, Agent, or Firm* — Lorenz & Kopf LLP

(57) ABSTRACT

A multi-network transceiver includes two or more receiver modules for simultaneously monitoring traffic broadcast on different networks, but a shared transmitter that switches between the different networks as needed for transmitting data. The shared transmitter reduces the circuitry that would otherwise be required to transmit on multiple networks while the multiple receiver modules preserve the ability to monitor traffic on multiple networks.

20 Claims, 3 Drawing Sheets

(56) References Cited

U.S. PATENT DOCUMENTS

Figure 1:
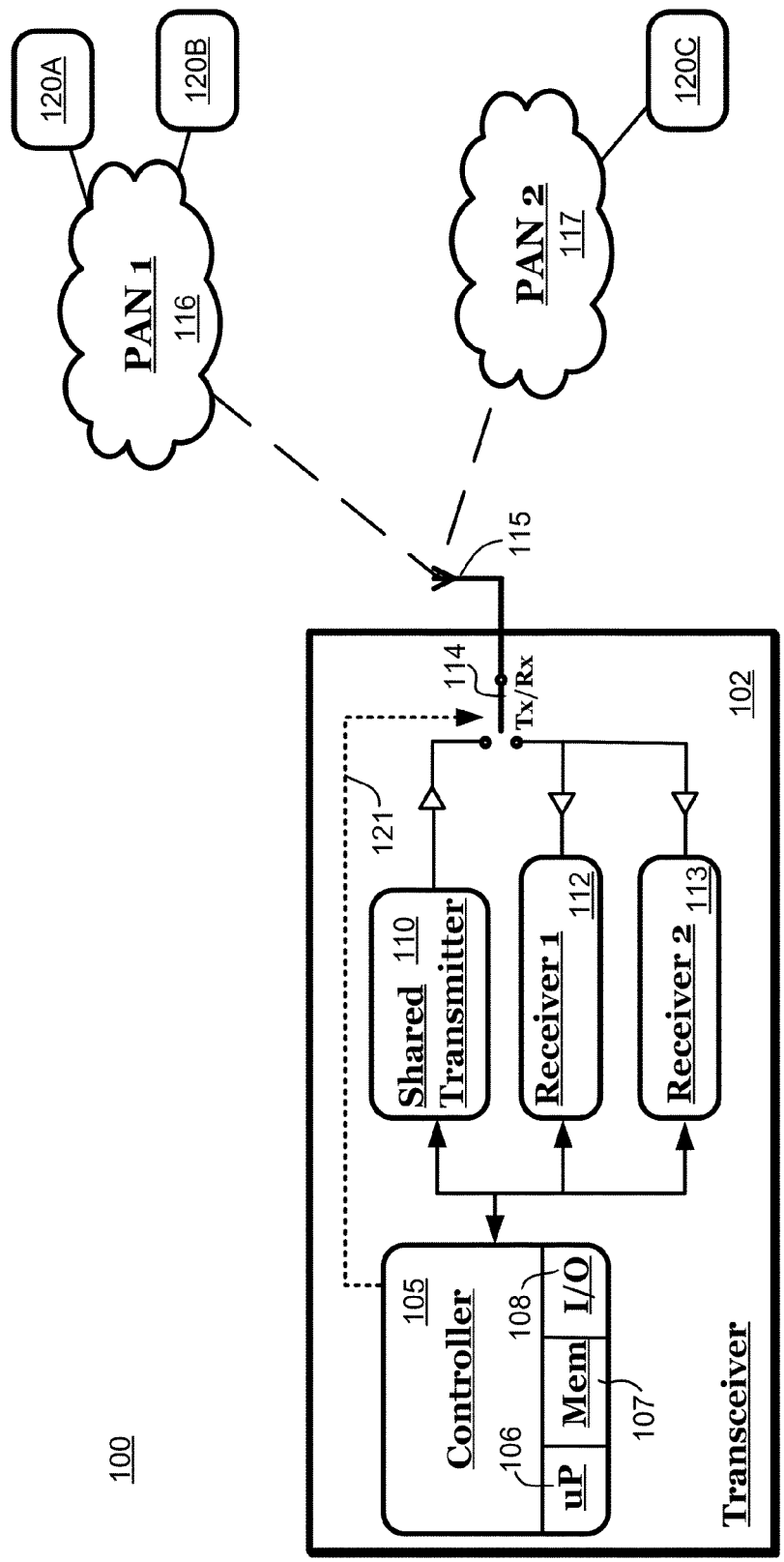

| | | | | |
|---|---|---|---|---|
| 2011/0159871 A1* | 6/2011 | Choo | ............... | H04W 8/26 |
| | | | | 455/426.1 |
| 2012/0064905 A1* | 3/2012 | Gustavsson | ......... | H04W 28/16 |
| | | | | 455/450 |
| 2013/0266324 A1* | 10/2013 | Diab | ............ | H04L 12/4625 |
| | | | | 398/116 |
| 2014/0024411 A1* | 1/2014 | Rao | ............... | H04W 88/06 |
| | | | | 455/553.1 |

* cited by examiner

MULTI NETWORK RADIO WITH SHARED TRANSMITTER

PRIORITY

This application is a continuation of U.S. patent application Ser. No. 14/045,378, which was filed on Oct. 3, 2013 and is incorporated herein by reference.

TECHNICAL FIELD

The present disclosure generally relates to wireless networks, and more particularly to systems, devices and techniques for sharing a transmitter between multiple wireless networks.

BACKGROUND

A personal area network (PAN) is a computer network that allows different devices operating within a relatively close proximity to communicate with each other. Often, PANs provide communications between mobile telephones, personal digital assistants, and/or other digital devices that are carried by, used by, or even worn by a common user. PANs can also be used to support communications between different electronic components operating in a home, workplace or other relatively close environment. Examples of PAN protocols, standards and other technologies include (without limitation) IrDA, USB, FireWire, Bluetooth, Z-Wave, Zigbee, Body Area Network and many others. Many of these technologies include sub-families of protocols. The Zigbee (IEEE 802.15) family of wireless standards, for example, includes separate protocols for consumer electronics (RF4CE), building automation, health care, home automation, retail services, smart energy, telecom services and others.

Many devices and applications are able to simultaneously communicate on multiple personal area networks. A set top box (STB) or similar television receiver, for example, may have a need to communicate with a remote control using the Zigbee RF4CE protocol while simultaneously acting as a home control unit for monitoring and/or controlling lights or other electrical appliances using the ZigBee Home Automation protocol. Even though the two Zigbee protocols in this example share commonalities in their base layers, the differences in higher layers are usually substantial enough to prevent the two protocols from sharing the same PAN. Most implementations therefore use completely separate PANs for the different types of communications (e.g., a first PAN for Zigbee RF4CE communications and a separate second PAN for Zigbee home automation communications in the example above). This typically involves redundant transceivers to support the multiple networks, and/or some sort of time multiplexing wherein a single transceiver splits its time between multiple networks. In the latter case, it is likely that at least some communications on one PAN will be undesirably missed while the single transceiver is monitoring a different PAN.

It is therefore desirable to create systems, devices and methods that operate simultaneously on multiple personal area networks in an efficient yet effective manner. These and other desirable features and characteristics will become apparent from the subsequent detailed description and the appended claims, taken in conjunction with the accompanying drawings and this background section.

BRIEF SUMMARY

Several examples of different embodiments are described herein. In various embodiments, a multi-PAN transceiver includes two or more receiver modules for simultaneously monitoring traffic broadcast on different PANs, but a single shared transmitter that switches between the different PANs as needed for transmitting data. The shared transmitter reduces the circuitry that would otherwise be required to transmit on multiple PANs while preserving the ability to monitor traffic on multiple networks. Moreover, performance is not compromised relative to a dual-transmitter implementation because current dual-transmitter devices are generally unable to transmit simultaneously on multiple PANs. Hence the shared transmitter provides a reduction in components, but not in performance relative to typical dual-transmitter implementations.

One example embodiment provides a transceiver to simultaneously operate on a first personal area network (PAN) and a second PAN. The transceiver suitably comprises a first receiver configured to receive data on the first PAN, a second receiver configured to simultaneously receive data on the second PAN, a shared transmitter that is switchable to transmit data on either the first PAN or on the second PAN, and a controller. The controller is appropriately configured to control the shared transmitter so that the shared transmitter transmits data on the first PAN when data is available for transmission on the first PAN and on the second PAN when data is available for transmission on the second PAN.

Another example embodiment provides a method executable by a digital controller to process simultaneous communications on a first personal area network (PAN) and on a second PAN. The method suitably comprises monitoring data received from the first PAN via a first receiver; simultaneously monitoring data received from the second PAN via a second receiver that is distinct from the first receiver; before transmitting data on either the first PAN or the second PAN, determining an appropriate time to transmit the data; and controlling a transmitter that is shared between the first PAN and the second PAN to thereby transmit data on either the first PAN or the second PAN as appropriate.

A further example embodiment provides a television receiver, mobile computing device or other computing system that communicates on a first personal area network (PAN) and a second personal area network (PAN). The system comprises a network, television or other input interface configured to receive input data; a display interface configured to provide processed data for output to a display; a controller configured to control processing of the received input data; and a multi-PAN transceiver. The multi-PAN transceiver suitably comprises a first receiver configured to receive data on the first PAN, a second receiver configured to receive data on the second PAN, and a shared transmitter that transmits on either of the first PAN and the second PAN as needed.

These example embodiments, as well as other embodiments, aspects and features, are described in detail below.

BRIEF DESCRIPTION OF THE DRAWING FIGURES

Figure 2:
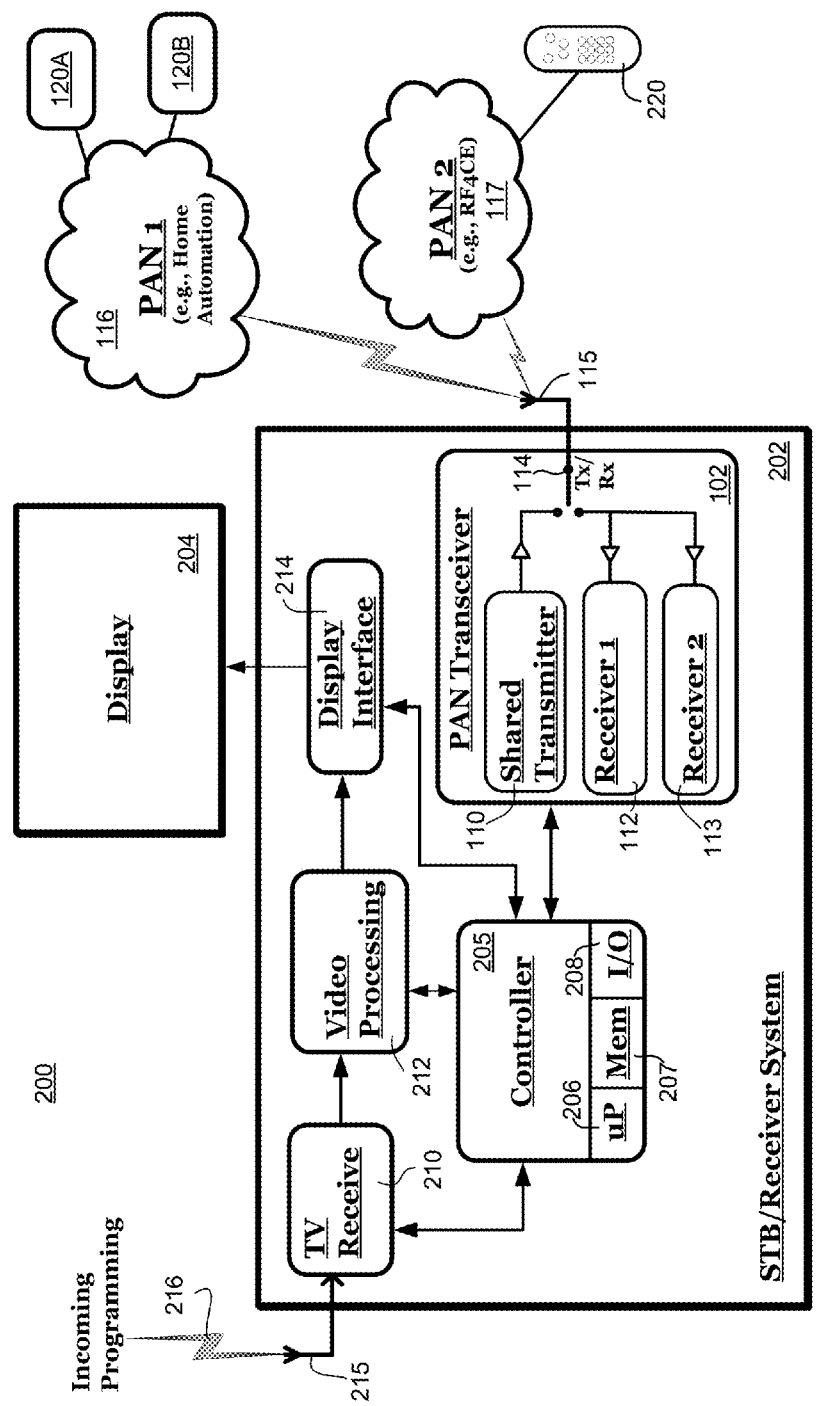
Figure 3:
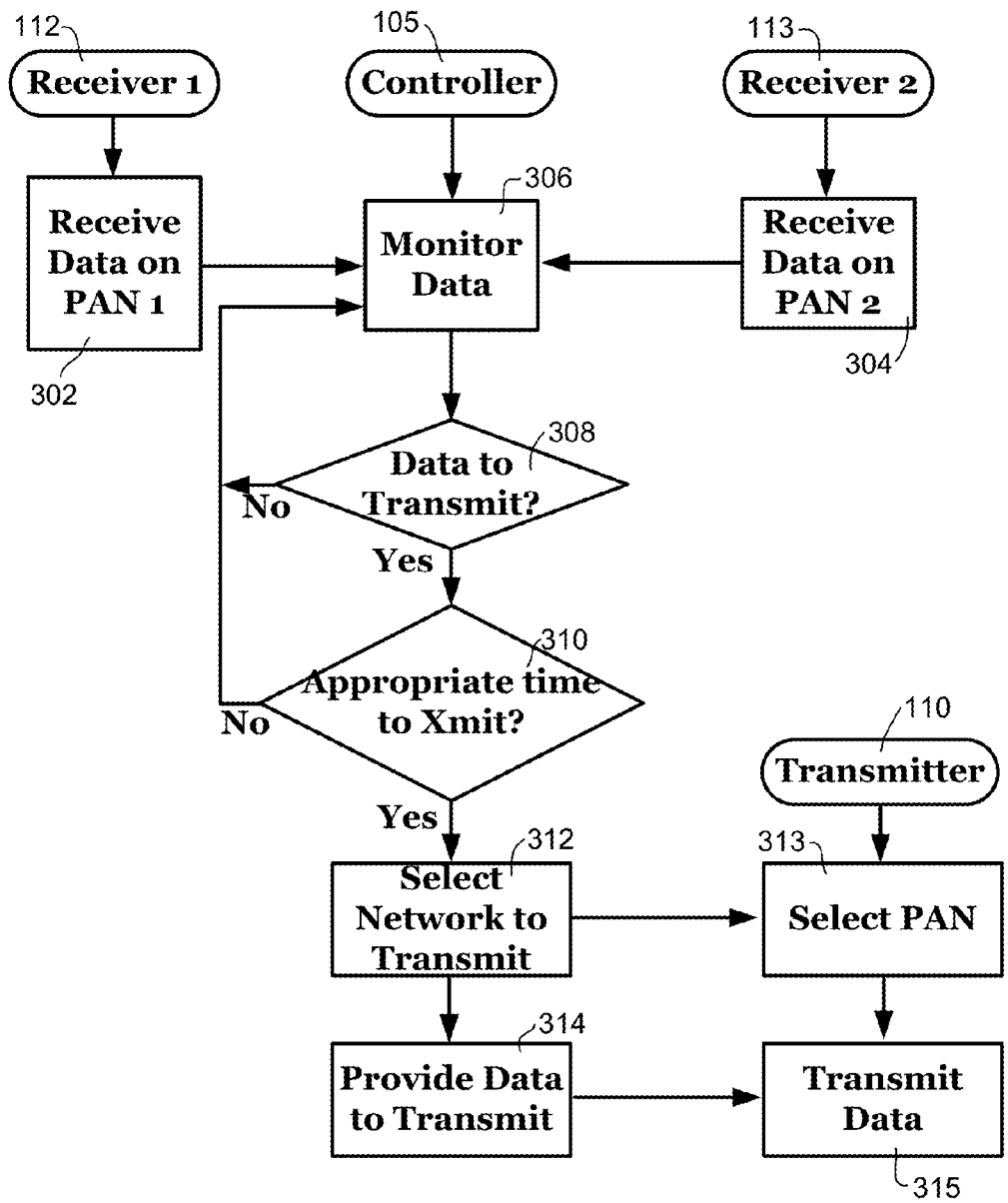

Exemplary embodiments will hereinafter be described in conjunction with the following drawing figures, wherein like numerals denote like elements, and FIG. 1 is a block diagram showing an example of a multi-PAN transceiver with a shared transmitter;

FIG. 2 is a block diagram showing an example of a computing system that includes a multi-PAN transceiver with a shared transmitter; and FIG. 3 illustrates an example of a process for operating a PAN transceiver having a single transmitter, multi-receiver.

DETAILED DESCRIPTION

The following detailed description of the invention is merely exemplary in nature and is not intended to limit the invention or the application and uses of the invention. Furthermore, there is no intention to be bound by any theory presented in the preceding background or the following detailed description.

According to various embodiments, a multi-PAN transceiver includes multiple, distinct receivers but a common, shared transmitter. Each receiver independently receives communications on a different PAN so that traffic on each PAN is simultaneously monitored. The shared transmitter, however, is switched between two or more PANs as needed to reduce the total circuitry while maintaining the ability to operate on multiple PANs. This arrangement preserves the ability to monitor multiple PANs while at the same time eliminating the redundancies that would otherwise be present if multiple transmitter circuits were used.

Various embodiments limit transmissions on either PAN to those times in which both PANs are otherwise inactive. This prevents a transmission on one PAN from overloading the receiver associated with the other PAN due to the close physical proximity to the receiver. Stated another way, whenever the transceiver transmits on any particular PAN, this close-proximity transmission is likely to overwhelm any external transmissions that would be otherwise be received on other PANs. Some implementations therefore determine that each of the monitored PANs is quiet before transmitting on any network, thereby reducing the chances of the transmission creating interference on any network. Other implementations could choose one or more PANs that are relatively fault-tolerant, and provide more interference on those networks rather than on networks that are less fault tolerant. Still other implementations decide transmit times in other ways, as desired.

Turning now to the drawing figures and with initial reference to FIG. 1, an exemplary multi-PAN transceiver suitably includes two or more receivers 112, 113 and a shared transmitter 110 that operate in response to commands received from a controller 105. Each receiver 112, 113 monitors a different PAN 116, 117 (respectively). Transmissions to any PAN 116, 117, however, are handled by a common transmitter 110. To that end, controller 105 is able to switch transmitter no as needed to communicate with other devices 120A-C on either PAN 112 or PAN 113.

Transceiver 102 may be implemented in any manner. In various embodiments, transceiver 102 is implemented as a system-on-chip (SoC) or the like using circuitry formed on a silicon or other semiconducting substrate. Such transceivers 102 may be provided as an integrated chip or other package. Other embodiments may use separate integrated or discrete circuitry to implement receiver 112, 113, transmitter 110 and/or controller 105 as desired.

Receivers 112, 113 are conventional receiver circuits or other logic used to receive PAN communications. Receivers 112, 113 may be implemented as conventional IEEE 801.15 "ZIGBEE" receiver circuitry, for example, in embodiments that make use of ZIGBEE protocols. Equivalent embodiments could support other PAN protocols, including any sort of wired or wireless protocols as desired. In much of the discussion herein, receivers 112, 113 are considered to be substantially identical to each other, but alternate embodiments may include various differences in circuitry, operating parameters, and/or supported protocols as desired.

The use of separate receivers 112, 113 allows simultaneous monitoring of both networks 116, 117. As noted above, prior implementations relied upon time sharing of a single receiver between multiple networks, which often resulted in the receiver missing data transmitted on networks that were not being monitored at a particular time. By providing separate receivers for each network, data on each network can be simultaneously monitored, thereby leading to less missed data. Moreover, performance is not compromised relative to a dual-transmitter implementation because even dual-transmitter devices would find it impractical to simultaneously transmit on multiple PANs.

Data received by each receiver 112, 113 may be provided to controller 105 for further processing and/or output. Other embodiments could provide received data to a separate output module or the like without routing all of the received data through controller 105, as appropriate.

Shared transmitter 110 may be implemented using any conventional transmitter circuits or other logic for transmitting PAN communications. Transmitter 110 may be implemented using conventional IEEE 801.15 "ZIGBEE" transmitter modules or other circuitry, for example, in embodiments that make use of ZIGBEE protocols. Equivalent embodiments could support other PAN protocols, including any sort of wired or wireless protocols as desired.

FIG. 1 shows each receiver 112, 113 receiving data via a shared antenna 115 that is switched between a transmit mode and a receive mode responsive to a control signal 121 from controller 105. In the transmit (Tx) mode, switch 114 is electrically isolated from receivers 112, 113 to prevent damage to the receivers during transmissions from transmitter 110. Conversely, both receivers 112, 113 receive signals from antenna 115 when switch 114 is in the receive (Rx) mode. Equivalent embodiments may use multiple antennas and/or any sort of hybrid antenna design, as appropriate.

Controller 105 therefore controls transmitter no and/or switch 114 to transmit data on either network 116 or network 117. When data is intended for transmission on either network, then controller 105 places switch 114 in the transmit mode via signal 121, and/or the shared transmitter no is otherwise directed to transmit on the appropriate network. Other embodiments may use separate antennas for transmit and receive functions so that transmitter 110 gets its own antenna. Many other embodiments and alternatives could be formulated.

Controller 105 is any sort of circuitry or other logic that is capable of controlling transmitter no and/or receivers 112, 113. In various embodiments, controller 105 is implemented with SoC or other circuitry that is integrated with receivers 112, 113 and transmitter 110. In other embodiments, controller 105 is implemented as a separate integrated circuit or other component, such as a digital signal processor or other control device, with conventional processing logic 106, memory 107 and input/output features 108. In such embodiments, processor logic 106 may execute software or firmware instructions that are stored in memory 107 or elsewhere, as desired.

In operation, then, transceiver 102 includes separate receiver modules 112, 113 for simultaneously receiving data on two or more PANs 116, 117 but a common transmitter no that is shared between the multiple PANs 116, 117. Data received on each PAN 116, 117 is monitored by controller 105, and data is transmitted on either PAN 116 or PAN 117 as needed. In some implementations, local data is transmitted only when all of the monitored networks 116, 117 are relatively quiet. Using the two network embodiment illustrated in FIG. 1 as an example, data would not be transmitted on PAN 116 when another device 120C is transmitting on PAN 117. This is because the transmission of data on antenna 114 would interfere with signal reception on antenna 115 due to the relatively close physical proximity within transceiver 102. These concepts could be expanded from the two network implementation illustrated in FIG. 1 to embodiments that simultaneously monitor any number of PANs but that share transmit hardware for the various networks.

Transceivers 102 as shown in FIG. 1 may be used in any number of computing systems, devices or the like. FIG. 2 shows an exemplary embodiment of a computing system 202 such as a set top box (STB) or similar television receiver. In this example, the computing system 202 uses a multi-PAN transceiver 102 to communicate with lights, home appliances or other devices 120A-B in a home environment using a first PAN 116 (e.g., a ZIGBEE Home Automation PAN). The computing system 202 in this example also uses multi-PAN transceiver 102 to communicate with a wireless remote control 220 via a second PAN 117 (e.g., a ZIGBEE RF4CE PAN or the like). Other embodiments could provide computing devices 202 that communicate with any number of different PANs 116, 117, including PANs based upon protocols other than ZIGBEE. Equivalent concepts could be further applied to other types of computing systems, including personal computers, mobile computers or telephones, consumer electronics devices, home/office/building/factory control systems, and/or the like. Other embodiments may therefore incorporate additional or alternate processing modules from those shown in FIG. 2, may omit one or more modules shown in FIG. 2, and/or may differently organize the various modules in any other manner different from the exemplary arrangement shown in FIG. 2.

In the example of FIG. 2, computing system 202 represents a DBS or cable television receiver that includes an input interface 210, a video processing module 212 and a display interface 214 for receiving, processing and outputting television signals, respectively. FIG. 2 therefore shows television signals 216 received at an antenna 215 that are provided to a television tuner/receiver acting as input interface 210. Equivalent embodiments could process data other than television signals. To that end, input interface 210 could represent an interface to the Internet or another communications network, an interface to a disk drive, media player and/or other storage device, and/or any other source of data as desired.

Controller 205 controls the various functions of computing system 202. In some implementations, controller 205 is implemented using a conventional microcontroller, digital signal processor or the like that includes processing logic 206, as well as digital memory 207 and any associated input/output features 208 as desired. In other embodiments, control logic 205 executes within an integrated SoC or other processor that also implements input interface 210, video processing 212, display interface 214, and/or other features, as appropriate. The Broadcom Corporation of Irvine, California, for example, produces several models of processors (e.g., the model BCM 7400 family of processors) that are capable of supporting SoC implementations of direct broadcast satellite and/or cable receiver systems, although products from any number of other suppliers could be equivalently used. In still other embodiments, various distinct chips, circuits or components may be inter-connected and inter-relate with each other to implement the various functions represented in FIG. 2.

Multi-PAN transceiver 102 may be similarly integrated with computing system 202 in any manner. In various embodiments, the multi-PAN transceiver 102 is incorporated within the same SoC or similar package as other components of system 202 so that functions of controller 105 (FIG. 1) can be integrated with and implemented within controller 205. That is, common control logic 205 could be used to monitor data received from receivers 112, 113 and/or to control the shared transmitter 110 as desired. Other embodiments may retain separate processing wherein the multi-PAN transceiver 102 retains its control circuitry 105 separate from controller 205. This may be the case, for example, when the multi-PAN transceiver 102 is provided as a separate chip or other package that resides on a circuit board or other component of computing system 202. The multi-PAN transceiver 102 may therefore be physically and logically integrated into any sort of computing system 202 in any manner.

Turning now to FIG. 3, an exemplary process 300 to operate a multi-PAN transceiver 102 is shown. As shown in FIG. 3, each receiver 112, 113 simultaneously receives data on a different PAN 116, 117 (functions 302, 304, respectively). Because each PAN 116, 117 has its own dedicated receiver 112, 113, each of the various networks can be simultaneously monitored (function 306), thereby greatly reducing the likelihood that a relevant message could be missed. Although FIG. 3 shows the controller 105 as performing the monitoring function, equivalent embodiments could use the receivers 116, 117 themselves to perform monitoring and processing of received data. In such cases, metadata or other information about the received data would typically be provided to the controller 105 instead of the received data itself.

Again, each network is simultaneously monitored as desired. When transmit data becomes available (function 308), then a suitable transmit time is identified (function 310). Data may be received from, for example, an application executing on system 202, a process executing on controller 205, and/or any other source.

A suitable transmit time typically corresponds to a time that all of the monitored PANs are inactive, as identified from the monitored data from each network. As noted above, transmissions by the transmitter 110 on any PAN will typically overwhelm any other transmissions that would be made by other devices 120A-C due to the close physical proximity of the transmitter 110 to receivers 112, 113 and/or antennas 114, 115. Various embodiments may temporarily disable signal reception by the receivers 112, 113 during transmissions by transmitter 110 to prevent undesired electrical or logical effects, although this may not be provided in all embodiments. Reception may be disabled by switching switch 114 to the transmit mode, or in any other manner.

If transmit data is available (function 308), the controller 105 suitably determines an appropriate time to transmit (function 310). Various embodiments could identify transmit times as those times in which all of the monitored networks are inactive to prevent unwanted interference with monitored traffic. Other embodiments could select one or more PANs 116, 117 to receive more or less interference than the other. That is, transmissions on one network could be timed to reduce interference on another network. If one PAN is relying upon real-time feedback while another PAN is more fault-tolerant, for example, then it may be desirable to avoid interference on the first network. This allows improved performance through management of transmissions on multiple networks to reduce interference on a preferred or less fault-tolerant network. In still other embodiments, the urgency of data could be considered relative to the interference caused on one or more networks. This could allow urgent traffic on one network to be transmitted even if it causes additional interference on a more tolerant network, for example. Controller 105 could use any other logic or algorithms to determine appropriate transmit times, as desired.

When one or more PANs are clear of other traffic, then the controller 105 suitably controls the transmitter 110 to select the appropriate network (function 312) and to provide the data for transmission (function 314). The shared transmitter 110 automatically selects the appropriate network (function 313) without further input from the user, and responsively transmits the appropriate data on the selected network (function 315).

Automatic selection of the appropriate network 116, 117 may take place in any manner (function 313). In various embodiments, controller 105 simply directs the transmitter to output the transmitted data on a particular signal path or pin. In other embodiments, controller 105 provides control signals 121 to transistors, relays, switches or similar components 114 that are able to selectively couple the shared transmitter to antenna 115. Other embodiments may couple the transmitter to a different antenna and/or provide any additional functions as desired.

FIG. 3 therefore provides an exemplary process 300 to operate a multi-PAN transceiver. Many of the functions shown in FIG. 3 may be carried out using programmable software code executed by any processing circuitry, such as control logic 105 and/or controller 205 as desired. The software code used to implement the various functions may be stored in memory, disk storage or other non-transitory storage (e.g., memory 107 and/or 207), and may be executed by any conventional microprocessor, microcontroller or other programmable circuitry 106, 206 and/or the like. Equivalent embodiments may supplement, modify and/or differently arrange the various functions shown in FIG. 3 in any manner.

The foregoing discussion therefore considers various systems, devices and methods to efficiently and effectively communicate on multiple simultaneous PANs. The general concepts set forth herein may be adapted to any number of equivalent embodiments. Although the discussion herein frequently considers PANs 116, 117 to be ZIGBEE or similar networks, for example, equivalent concepts could be applied to other wired or wireless PAN protocols, including IrDA, USB, FireWire, Bluetooth, Z-Wave, Zigbee, Body Area Network and/or the like. Many other enhancements, modifications and other changes could be made in a wide array of alternate but equivalent embodiments.

The term "exemplary" is used herein to represent one example, instance or illustration that may have any number of alternates. Any implementation described herein as exemplary is not necessarily to be construed as preferred or advantageous over other implementations. While several exemplary embodiments have been presented in the foregoing detailed description, it should be appreciated that a vast number of alternate but equivalent variations exist, and the examples presented herein are not intended to limit the scope, applicability, or configuration of the invention in any way. To the contrary, various changes may be made in the function and arrangement of elements described without departing from the scope of the claims and their legal equivalents.

What is claimed is:

1. A transceiver to simultaneously operate on a first data network and a second data network, the transceiver comprising:
    a first receiver configured to receive data on the first network;
    a second receiver configured to receive data on the second network at the same time that the first receiver is receiving data on the first network;
    a shared transmitter that is switchable to transmit data on either the first network or on the second network; and
    a controller configured to control the shared transmitter so that the shared transmitter automatically transmits data on the first network when data is available for transmission on the first network and on the second network when data is available for transmission on the second network.

2. The transceiver of claim 1 wherein the controller is further configured to simultaneously monitor the data received on the first network by the first receiver and on the second network by the second receiver to thereby identify a time in which the first network and the second network are both inactive.

3. The transceiver of claim 2 wherein the controller is further configured to automatically control the transmitter so that data is transmitted on either the first network or the second network only when the first network and the second network are both inactive.

4. The transceiver of claim 3 wherein the first network is more fault-tolerant than the second network, and wherein the controller is further configured to transmit data on the first network and on the second network when the second network is inactive.

5. The transceiver of claim 1 wherein the controller is further configured to simultaneously monitor the data received on the first network by the first receiver and on the second network by the second receiver.

6. The transceiver of claim 1 wherein controller is further configured to provide a control signal to a switch that couples an antenna to the shared transmitter during a transmit mode and that couples the antenna to the first and second receivers during a receive mode.

7. The transceiver of claim 1 wherein the first receiver, second receiver, shared transmitter and controller are formed on a common semiconducting substrate.

8. The transceiver of claim 1 wherein the first and second networks are separate personal area networks (PANs).

9. The transceiver of claim 1 wherein the first receiver, second receiver, shared transmitter and controller are housed in a common package.

10. A method executable by a digital controller to process simultaneous communications on a first wireless network and on a second wireless network, the method comprising:
    monitoring data received from the first wireless network via a first receiver;
    simultaneously monitoring data received from the second wireless network via a second receiver that is distinct from the first receiver;
    before transmitting data on either the first wireless network or the second wireless network, determining from the monitored data that the first wireless network and the second wireless network are both inactive; and
    controlling a transmitter that is shared between the first wireless network and the second wireless network to thereby transmit data on either the first wireless network or the second wireless network only when the first wireless network and the second wireless network are both inactive.

11. The method of claim 10 wherein the controlling comprises switchably coupling an antenna to at least one of the first and second receivers in a first mode for receiving signals on the first and second wireless networks, respectively, or to the shared transmitter in a second mode for transmission on either the first wireless network or the second wireless network.

12. The method of claim 11 wherein the antenna is coupled to both the first receiver and to the second receiver in the first mode to simultaneously receive data on both the first wireless network and on the second wireless network.

13. The method of claim 10 further comprising disabling both the first receiver and the second receiver when the shared transmitter is transmitting on either the first wireless network or the second wireless network.

14. A computing system that communicates on a first wireless network and a second wireless network, the system comprising:
an input interface configured to receive input data;
a controller configured to control processing of the received input data; and
a multi-network transceiver that communicates with the controller, wherein the multi-network transceiver comprises a first receiver configured to receive data on the first wireless network, a second receiver configured to receive data on the second wireless network, and a shared transmitter that switchably transmits on either of the first wireless network and the second wireless network.

15. The computing system of claim 14 wherein the shared transmitter is configured to transmit only when both the first wireless network and the second wireless network are otherwise inactive.

16. The computing system of claim 14 wherein the controller and the multi-network transceiver are formed on a common semiconducting substrate.

17. The computing system of claim 14 wherein the controller, the multi-network transceiver and a display interface are formed on the common semiconducting substrate.

18. The computing system of claim 14 wherein the first network and the second network are both ZIGBEE personal area networks.

19. The computing system of claim 14 wherein the computing system is a television receiver, the input interface is a television receiver interface, and the display interface is an interface to a television.

20. The computing system of claim 19 wherein the first wireless network is a ZIGBEE RF4CE personal area network that supports communications between the television receiver and a wireless remote control, and wherein the second wireless network is a ZIGBEE Home Automation personal area network that supports communications between the television receiver and a plurality of home appliances.

* * * * *